Oct. 8, 1929.    W. J. ATWELL ET AL    1,730,963
DROWNING TRAP
Filed Sept. 22, 1927
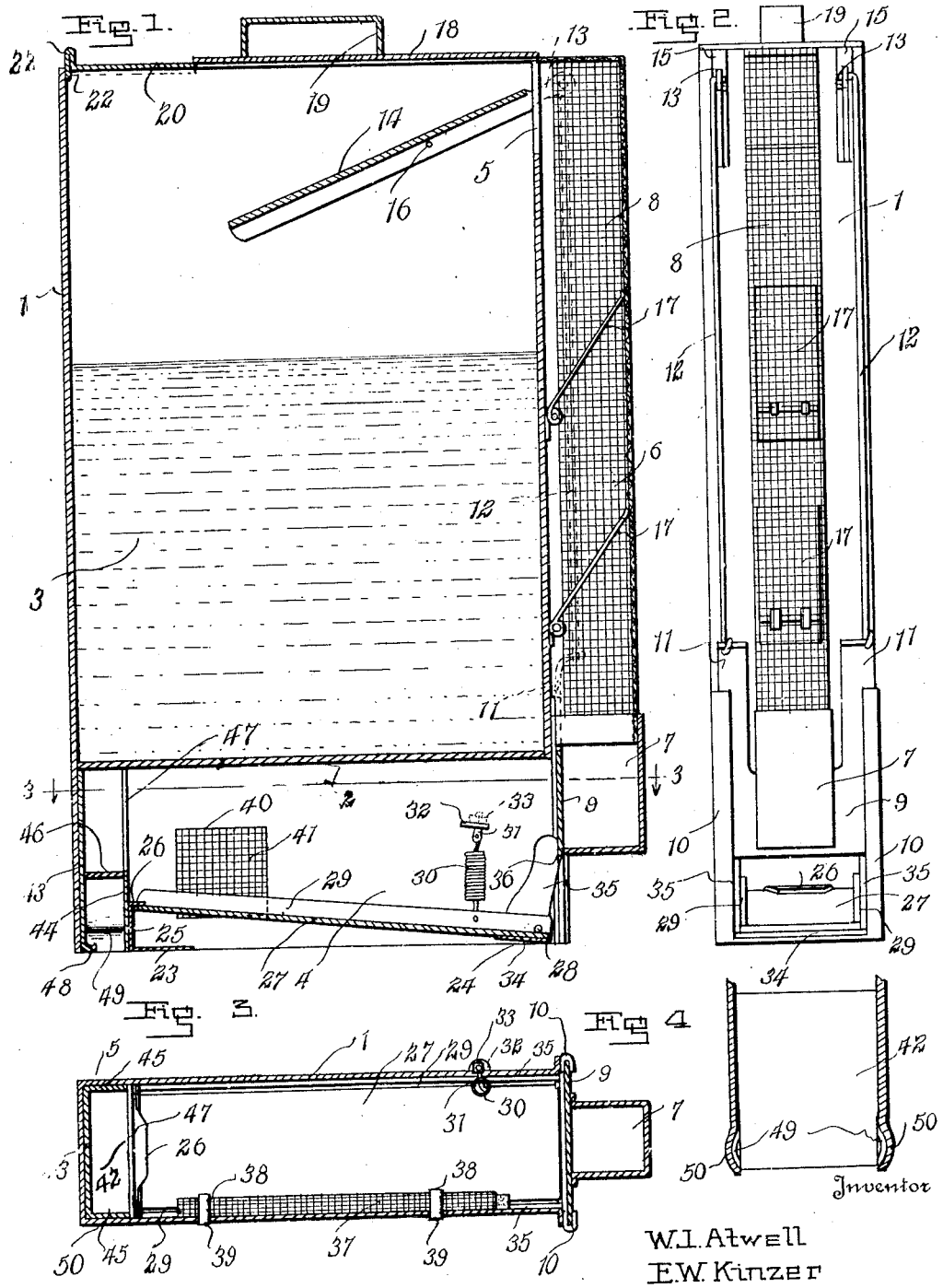
Inventor
W. J. Atwell
E. W. Kinzer
By Lacey & Lacey, Attorneys Patented Oct. 8, 1929

1,730,963

UNITED STATES PATENT OFFICE

WILLIAM J. ATWELL AND EDWARD W. KINZER, OF BOISSEVAIN, VIRGINIA; SAID ATWELL ASSIGNOR TO SAID KINZER

DROWNING TRAP

Application filed September 22, 1927. Serial No. 221,283.

This invention relates to traps and more particularly to a trap in which rats and other small animals may be caught and caused to become drowned as they endeavor to escape.

One object of the invention is to provide a trap divided into an entrance chamber and a drowning chamber having a passageway leading to the entrance chamber, platforms being movably mounted in the entrance chamber and drowning chamber and adapted to control movement and position of a door for closing the inlet of the entrance chamber.

Another object of the invention is to prevent the animal from returning to the entrance chamber after approaching the drowning chamber through the passageway leading thereto and thereby compel the animal to enter the drowning chamber in order to escape from the passageway.

Another object of the invention is to so dispose the passageway with respect to the entrance chamber that the door which closes the inlet to the entrance chamber may, when in an open position, close the end of the passageway which communicates with the entrance chamber.

Another object of the invention is to cause the door to be moved upwardly to an open position with respect to the inlet of the entrance chamber when an animal steps upon a tilting platform in the drowning chamber and releasably secure the door in a raised position by a latch extending from a platform tiltably mounted in the entrance chamber.

Another object of the invention is to provide improved bait holders disposed in the entrance chamber in such position that an animal will be enticed into the chamber and along the tilting platform to such a position that its weight will tilt the platform and move the latch out of engagement with the door so that the door may move downwardly to close the inlet of the entrance chamber and establish communication between the entrance chamber and passageway.

The invention is illustrated in the accompanying drawing, wherein

Figure 1 is a vertical sectional view through the improved trap;

Fig. 2 is a view showing the trap in front elevation;

Fig. 3 is a horizontal sectional view through the trap taken on the line 3—3 of Fig. 1, and Fig. 4 is a fragmentary sectional view through the trap.

The improved trap consists of a body 1 formed of strong sheet metal and having a horizontally disposed partition 2 provided therein to divide the body into an upper water receiving compartment or chamber 3 and a lower entrance chamber 4. The lower compartment is provided with an inlet at its forward end and communicates with the inlet 5 of the upper compartment through the medium of a passageway 6, the lower portion 7 of which is formed of sheet metal and the remainder 8 of woven wire. The sheet metal lower portion 7 of the passageway extends downwardly partially across the open forward end of the lower compartment and overlaps a door 9 which is also formed of sheet metal and is mounted for vertical sliding movement in tracks 10 disposed at the sides of the front of the housing. This sliding door 9 is of such depth that it may close the inlet opening at the front of the lower chamber when moved downwardly to extend below the lower end of the passageway or interrupt communication between the passageway and the lower compartment when in the elevated position shown in Fig. 1. Arms 11 extend upwardly from the door and are engaged with the lower ends of rods 12, the upper ends of which are pivotally connected with arms 13 which extend from a platform 14 through slots 15 formed in the upper end portion of the front wall of the housing at opposite sides of the entrance 5 to the drowning chamber. The weight of the door and rods is sufficient to overcome the weight of the inner end portion of the platform which is pivotally mounted in the drowning chamber by a pivot pin 16 and, therefore, unless the door is supported in a raised position it will have a tendency to move downwardly into closing relation to the inlet of the entrance chamber and remain closed until a rat or other similar animal crawls upwardly through the passageway past the pivoted barriers 17 and after entering the upper chamber through the inlet 5 moves along the platform 14 until its weight swings the inner end portion of the platform downwardly to precipitate the animal into the water and through the medium of the rods 12 draw the closure upwardly into closing relation to the lower end of the passageway. The upper wall or head 18 of the body is provided with a carrying handle 19 and terminates in spaced relation to the rear wall in order to define an opening through which water may be poured into the upper drowning compartment or an animal removed therefrom. This opening is normally closed by a door 20 slidably engaged with the side walls of the housing or body by depending side flanges and has one end portion bent upwardly and then downwardly to provide an upstanding lip 21 to be grasped in order to easily slide the door into and out of covering relation to the opening and a depending tongue 22 to engage the rear wall of the housing and prevent the door from being slid outwardly in a closing direction beyond the position shown in Fig. 1.

The lower compartment or entrance chamber 4 is open at its bottom but is bridged by cross strips 23 and 24 which are soldered or otherwise anchored to the side walls of the body and the rear strip 23 carries an upstanding lip 25 having a forwardly projecting flange or tongue 26 at its upper end which constitutes a stop to prevent the platform 27 from moving upwardly beyond the position shown in Fig. 1. This platform extends longitudinally in the entrance chamber and is pivotally mounted by a pin 28 which extends through the forward end portions of its side flanges 29 and has its ends rotatably mounted in openings formed in the side walls of the housing. A spring 30 is engaged with one of the side flanges 29 and has its upper end connected with a threaded stem or bolt 31 which passes outwardly through a tongue 32 struck from the adjacent side wall of the housing and carries a nut 33 by means of which the bolt may be adjusted to regulate the tension of the spring. It will thus be seen that the spring may normally retain the platform in a raised position but may be adjusted so that animals of a certain size and weight may cause the platform to swing downwardly when they approach its free inner end but smaller animals will not operate the trap. If desired, a similar spring may be provided to engage the flange at the other side of the platform. A latch is carried by the platform adjacent its forward end and consists of a strip 34 which extends beneath the forward end of the platform and has its end portions bent to provide arms 35 which extend upwardly at substantially right angles to the platform and adjacent their free ends are formed with notches 36 to receive the lower edge of the sliding door 9. It will thus be seen that when the platform is in its normal position the latches will engage the lower edge of the sliding door and prevent the door from moving downwardly into closing relation to the inlet of the entrance chamber.

In order to entice an animal into the trap, there has been provided a bait holder 37 consisting of a wire tube into which food eaten by the animal to be caught is placed. This tube extends longitudinally in the entrance chamber and adjacent its ends is encircled by collars 38 having tongue extensions 39 passed through slots formed in a side wall of the entrance chamber. If only one spring 30 is employed, the bait holder is preferably supported from the wall opposite to which the spring is connected. If desired, a window opening 40 covered by screening 41 may be formed adjacent the inner end of the entrance chamber. We also provide a second bait holder 42 consisting of a box-like structure formed of sheet metal and having a rear wall 43, a front wall 44 and side walls 45. The upper portion of the front wall is severed from the side walls and bent downwardly and rearwardly to provide a bottom 46 for an upper chamber in which the bait is placed and a strip of screening 47 extends across the front of this chamber and is secured to the side walls. From an inspection of Figs. 1 and 3, it will be seen that when bait is placed in the upper chamber of the bait holder 42 it will be so located that an animal entering the trap will be enticed along the platform but cannot consume the bait. The lower portion of the rear wall is bent inwardly to provide a flange 48 to be grasped in order to permit the bait holder to be easily withdrawn and the lower portions of the side walls are severed from the front and rear walls and bent to provide latch arms 49 which extend outwardly and are seated in recesses or depressions 50 formed in the side walls of the body. By this arrangement the bait holder 42 will be firmly held in place so that it will not be liable to drop out when the trap is grasped by its handle 19 and lifted from the ground in order to carry it from one place to another but by inserting the fingers into the lower portion of the bait holder and engaging the flange 48 the bait holder may be easily withdrawn in order to replenish the bait.

When the trap is in use, bait is placed in the bait holders 37 and 42 and the bait holders properly disposed in the lower entrance chamber. Water is then poured into the upper drowning chamber and the door 20 moved to a closed position. The latch arms engage the door 9 to support it in a raised position and the trap is ready for operation. When the animal approaches the trap, it will be enticed into the entrance chamber by the bait in the bait holder 37 and when it finds it cannot obtain access to the bait in this holder it will move inwardly along the platform towards the inner bait holder. If desired, a more attractive bait may be placed in the inner bait holder. As the animal moves along the platform and approaches the inner end thereof, the weight of the animal will cause the platform to swing downwardly against the tension of the spring 30 and the latch arms will be swung inwardly from supporting engagement with the door 9. As soon as the latch arms move out of engagement with the door, the weight of this door will cause it to slide downwardly to close the inlet of the entrance chamber and establish communication between the entrance chamber and the lower end of the passageway 6. As soon as the door has moved downwardly to close the inlet of the entrance chamber, the animal will be prevented from passing out of the entrance chamber through the inlet thereof and in its endeavor to escape it will enter the lower end of the passageway. The animal then climbs up the passageway by engaging its feet in the wire mesh from which the portion 8 of the passageway is formed and since the barriers 17 normally remain in the position shown in Fig. 1 and will return to this position after an animal has passed them it will be impossible for the animal to descend after passing a barrier. When the animal reaches the top of the passageway, it passes through the opening 5 into the housing and steps upon the platform 14 which will now be held in a horizontal position. As soon as the animal passes the pivot 16 of the platform and approaches the inner end thereof, its weight will cause this upper platform to tilt downwardly and precipitate the animal into the water with which the upper compartment is partially filled and the animal will be drowned. Downward movement of the inner end portion of the upper platform will cause its arms 13 to be swung upwardly and draw upon the rods 12 to lift the door 9 and restore it to the position shown in Fig. 1. The spring which draws upon the lower platform 27 will immediately cause the latch arms to move beneath the lower edge of the door and support it in a raised position. Therefore, as soon as the animal tilts the platform 14 downwardly and is precipitated into the water in the drowning chamber, the inlet of the entrance chamber will be again opened and the trap reset. It will thus be seen that any number of animals may be caught in the trap and each causes the trap to be reset as it moves along the upper platform and is precipitated into the upper drowning chamber.

Having thus described the invention, we claim:

1. A trap comprising an entrance chamber, a confining chamber, a passage leading from the inlet of the confining chamber and communicating with the entrance chamber through the inlet thereof, a common closure for the inlet of the entrance chamber and adjacent end of said passage slidably mounted and movable to alternately close the same, means in the entrance chamber to releasably retain the closure out of closing relation to its inlet and adapted to be moved to release the closure by an animal within the entrance chamber, and means within the confining chamber connected with the closure and adapted to be moved by an animal within the confining chamber to restore the closure to an open position with respect to the inlet of the entrance chamber.

2. A trap comprising an entrance chamber, a confining chamber, a passage leading from one chamber to the other and communicating with inlets thereof, a common closure for the inlet of the entrance chamber and adjacent end of said passage and movable to alternately close the same, a platform tiltably mounted in the entrance chamber and having an arm extending therefrom to engage the closure and retain the closure in an open position with respect to its inlet, means to yieldably retain the platform in position for its arm to engage said closure, means to limit movement of the platform by the yieldable means, and means within the confining chamber connected with the closure and adapted to be moved by an animal within the confining chamber to restore the closure to an open position with respect to the inlet of the entrance chamber.

3. A trap comprising an entrance chamber, a confining chamber, a passage leading from one chamber to the other and communicating with inlets of the chambers, a common closure for the inlet of the entrance chamber and adjacent end of the passage and movable to open one and close the other, a platform tiltably mounted in the entrance compartment and yieldably held in position to engage said closure and retain the closure out of closing relation to the inlet of the entrance chamber, and a platform tiltably mounted in the confining chamber and connected with the closure to move the closure to an open position with respect to the inlet of the entrance chamber when swung downwardly by the weight of an animal, the closure having movement into closing relation to the inlet of the entrance chamber when the first platform is moved out of engagement therewith by the weight of an animal walking thereon.

4. A trap comprising an entrance chamber and a confining chamber, each having an inlet, a passageway leading from the inlet of said confining chamber and overlapping the inlet of the entrance chamber to communicate therewith, a door slidably mounted for movement from a position to close the inlet of the entrance chamber to a position to close the adjacent end of said passageway and when closing one leaving the other open, a platform pivotally mounted in said confining chamber and connected with said door to cause the door to move out of closing relation to the inlet of the entrance chamber when the platform is tilted by the weight of an animal, a platform in the entrance chamber movably mounted and yieldably held in a raised position, and means carried by the last-mentioned platform to engage said door and releasably retain the door out of closing relation to the inlet of the entrance chamber.

5. A trap comprising an entrance chamber and a confining chamber, each having an inlet, a passageway leading from the inlet of said confining chamber and overlapping the inlet of the entrance chamber to communicate therewith, a door slidably mounted for movement from a position to close the inlet of the entrance chamber to a position to close the adjacent end of said passageway and when closing one leaving the other open, a platform pivotally mounted in said confining chamber and connected with said door to cause the door to move out of closing relation to the inlet of the entrance chamber when the platform is tilted by the weight of an animal, a platform in the entrance chamber movably mounted and yieldably held in a raised position, and means carried by the last-mentioned platform to engage said door and releasably retain the door out of closing relation to the inlet of the entrance chamber.

6. A trap comprising a body, a partition dividing said body into upper and lower chambers, the front wall of the body having upper and lower openings constituting inlets for the chambers, a tube disposed vertically along the front wall of the body with its upper end enclosing the inlet of the upper chamber and its lower end partially overlapping the inlet of the lower chamber, a door slidably carried by the front wall for vertical movement into and out of position to alternately close the lower end of the passage and inlet of the lower chamber, a platform tiltably mounted in the upper chamber adjacent its inlet and having arms extending outwardly through slots in the front wall at opposite sides of the passage and connected with said door whereby when the platform is tilted by the weight of an animal the door will be drawn upwardly to open the inlet of the lower chamber and close the lower end of the passage, and means in the lower chamber normally in position to support the door in a raised position and adapted to be moved out of position to support the door by an animal entering the lower chamber.

7. A trap comprising a body having upper and lower chambers each having an inlet in its front wall and the upper compartment having an opening through which an animal may be removed, a passageway leading from the inlet of the upper chamber and partially overlapping the inlet of the lower chamber, a platform pivotally mounted in the upper chamber and having arms projecting out of the body at opposite sides of the passageway, rods extending downwardly from said arms, a door engaged with said rods and slidably mounted for movement from a position to close the lower end of said passageway to a position to close the inlet of the lower chamber and having sufficient weight to normally remain in a lowered position in closing relation to the inlet of the lower chamber, a trip movably mounted in said lower chamber and yieldably held in a normal position and adapted to be moved out of its normal position by an animal entering the lower chamber, and a latch carried by said trip adapted to engage said door when the trip is in its normal position and releasably support the door in a raised position.

In testimony whereof we affix our signatures.

WILLIAM J. ATWELL. [L. S.]
EDWARD W. KINZER. [L. S.]